S. J. YUNDT.
Drain-Pipes.

No. 149,367.

Patented April 7, 1874.

Witnesses.

S. J. Yundt
Inventor.

UNITED STATES PATENT OFFICE.

SAMUEL J. YUNDT, OF PLYMOUTH, INDIANA.

IMPROVEMENT IN DRAIN-PIPES.

Specification forming part of Letters Patent No. 149,367, dated April 7, 1874; application filed September 16, 1873.

*To all whom it may concern:*

Be it known that I, SAMUEL J. YUNDT, of Plymouth, in the county of Marshall and State of Indiana, have invented a certain Improvement in Drain-Pipes, of which the following is a specification:

This invention relates to an implement to be used for draining low wet lands, cellars, sink-holes, sloughs, and all other places where water may be required to be removed from or near the surface, and distributed or wasted in the earth at a lower level; and it consists in the construction, combination, and arrangement of some of its parts, as will be more fully set forth hereinafter.

Figure 1:
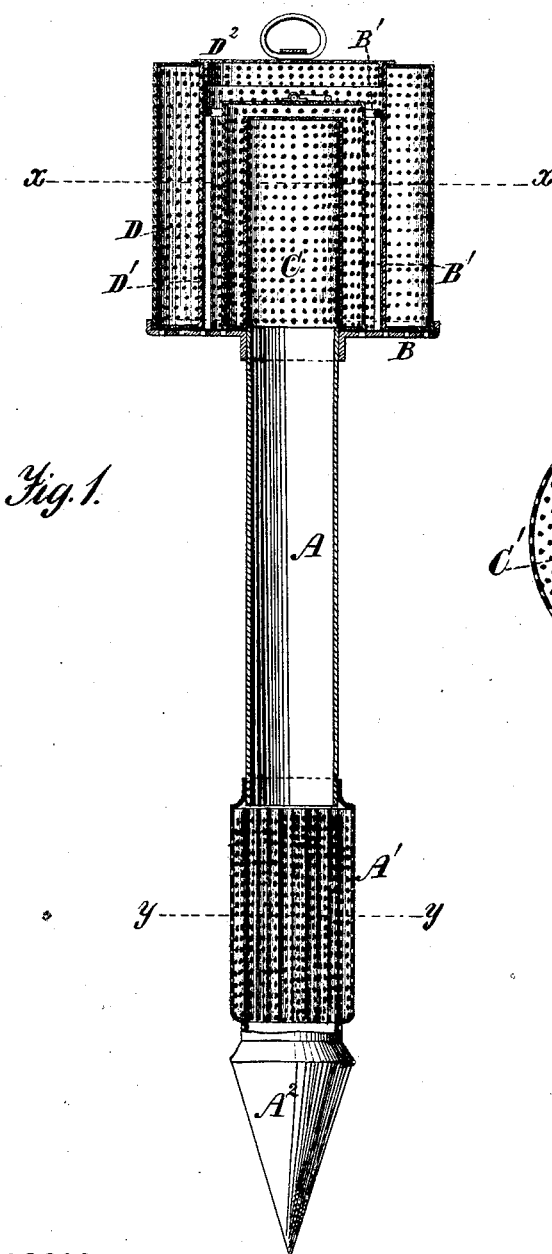
Figure 2:
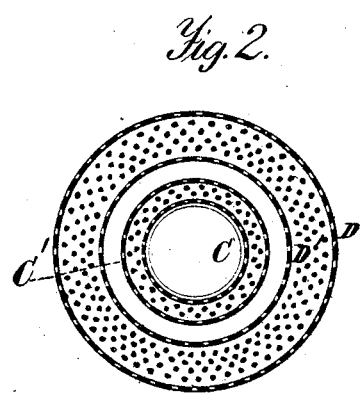
Figure 3:

Figure 1 is an elevation of my improved pipe or tube, showing the projecting strainers upon its upper end, the body of the pipe through which the water passes, the distributing-strainer below, and the pointed lower end for facilitating its introduction into the earth. Fig. 2 is a transverse section on line $x\,x$ of Fig. 1, showing the strainers upon the upper end of the tube and the space between them; and Fig. 3 is a transverse section on line $y\,y$ of Fig. 1, showing the form of the distributing-strainer.

Corresponding letters indicate corresponding parts in the several figures.

In constructing implements of this character, I use a tube, A, of iron or of other suitable material, which is to be of any required diameter to conduct the amount of water which it is required to remove, its length being such as to cause its lower perforated end, or a strainer affixed to or near its lower end, to penetrate stratums of sand, gravel, or rock, which will allow the water that flows down through said tube from the surface of the earth, or from the point where the upper end of the tube is fixed, to be distributed into such stratums. To the lower end of the tube A there is affixed a section of corrugated and perforated pipe, A', which may be of sheet or of cast metal, the corrugation answering to increase the distributing-surface to such an extent as to insure the free passage of all the water which can pass through the pipe A. To this end, the combined area of the perforations is equal to or greater than the area of said pipe. In cases where this implement is placed in a hole which has been dug for it, its lower end should be closed by having a plug or head placed in it to prevent the earth or other substances from rising therein; but when it is to be forced or driven into the earth, as will generally be the case, it is to be provided with a pointed or conical plug or end, $A^2$, in order that its entrance and passage down into the earth may be facilitated. Surrounding the upper portion of the pipe A there is a flange or collar, B, through which said pipe passes for a short distance, said collar being perforated with a series of holes, in order that any water which may collect under it may pass through it, and thus find access to the discharge-pipe. To the upper surface of the collar B there is affixed a frame, B', which is for the purpose of supporting within it a double strainer, C C', the interior one of which is of such size as to fit upon the upper projecting portion of pipe A, it being closed at its upper end by a head perforated like the other portion. This section of the strainer may be of any desired length and diameter to be regulated by the depth of the wet stratums of earth which it is desirable to drain, or the amount of water to be conducted away. Surrounding the interior chamber C there is another one, C', the interior diameter of which is somewhat greater than the outer diameter of the one lettered C, and, protruding above the same, is closed at its upper end by a perforated head, to the outer surface of which there is secured a ring or handle for the purpose of removing it whenever it becomes necessary to clean it from leaves, mud, or any other obstruction to the passage of the water. Outside of the frame B', and inclosing it and the strainer C C', there is placed another double strainer, the walls D and $D^1$ of which are united at the top and bottom by perforated annular plates. The central passage through it is closed on top by a removable perforated head, $D^2$.

The object of the above-described construction of strainers and making them double is to enable the user to remove and clean one of them, while the other remains in place to prevent any material which would clog the lower or distributing-strainer from entering the pipe.

It will readily be seen that when all of the upper strainers are in the position represented in Fig. 1, the upper end of the pipe A is fully protected, and that no obstruction to the passage of the water can enter it; but, as it will sometimes become necessary to have a portion or all of the upper strainer below the surface of the earth, they will be liable to become clogged with earth, leaves, or grass, in which case the outer strainer D D$^1$ D$^2$ can be removed and cleaned, while the interior ones remain in place to protect the pipe, after which it can be replaced, and the portion D$^2$ removed, and the one C' withdrawn and cleaned, and, if necessary, the section C also, the outer one at such time preventing any foreign substance from entering the pipe.

Having thus described my invention, what I claim, and desire to secure by Letters Patent, is—

The combination of the pipe A, the strainer A$^1$, and strainers D D$^1$ and C C', when constructed and arranged substantially as and for the purpose set forth.

In testimony whereof I have signed my name to this specification in the presence of two subscribing witnesses.

SAMUEL J. YUNDT.

Witnesses:
 D. P. HOLLOWAY,
 B. EDW. J. EILS.